United States Patent
Siti et al.

(10) Patent No.: US 8,358,685 B2
(45) Date of Patent: Jan. 22, 2013

(54) ITERATIVE DETECTION AND DECODING IN MULTIPLE ANTENNA COMMUNICATION SYSTEMS

(75) Inventors: Massimiliano Siti, Peschiera Borromeo (IT); Oscar Volpatti, Rovellasca (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 445 days.

(21) Appl. No.: 12/640,927

(22) Filed: Dec. 17, 2009

(65) Prior Publication Data
US 2010/0183065 A1    Jul. 22, 2010

(30) Foreign Application Priority Data
Dec. 18, 2008    (EP) .................................... 08172100

(51) Int. Cl.
*H04L 27/10*    (2006.01)
(52) U.S. Cl. ......... 375/233; 375/148; 375/350; 375/262
(58) Field of Classification Search .............. 375/141, 375/144, 147, 148, 233, 260, 340, 347, 349, 375/350, 267, 262, 265
See application file for complete search history.

(56) References Cited

U.S. PATENT DOCUMENTS

| | | | | |
|---|---|---|---|---|
| 7,551,664 B2* | 6/2009 | Zhang et al. | .................. | 375/147 |
| 7,616,695 B1* | 11/2009 | Sarrigeorgidis | .............. | 375/260 |
| 7,809,055 B2* | 10/2010 | Shtin | ............................. | 375/232 |
| 2008/0123764 A1* | 5/2008 | McNamara et al. | .......... | 375/261 |
| 2008/0137763 A1 | 6/2008 | Waters et al. | | |
| 2008/0310554 A1* | 12/2008 | Siti et al. | ........................ | 375/340 |

FOREIGN PATENT DOCUMENTS

| | | |
|---|---|---|
| EP | 1971063 | 9/2008 |
| WO | 2007012053 | 1/2007 |
| WO | 2008082226 | 7/2008 |

OTHER PUBLICATIONS

IEEE P802.11n™ /D2.0, Feb. 2007, "Draft Amendment to [. . . ] -Part 11: Wireless LAN Medium Access Control (MAC) and Physical Layer (PHY) specifications: Enhancements for Higher Throughput", A. Stephens et al.

(Continued)

*Primary Examiner* — Dac Ha
(74) *Attorney, Agent, or Firm* — Graybeal Jackson LLP

(57) ABSTRACT

One or more embodiments to iteratively detect and decode data transmitted in a wireless communication system, featuring a MIMO detector and a soft input soft-output error-correction-code decoder. More specifically, a method suitable for iterative detection and decoding schemes is proposed, which is able to output near optimal bit soft information processing efficiently given input bit soft information. First, a transmitting source is selected as a reference layer, wherein the associated symbol represents a reference transmit symbol. Subsequently, a set of candidate values are identified for the reference transmit symbol. For each candidate value a candidate transmit sequence is estimated through a novel spatial decision feedback equalization process based on both Euclidean distance metrics and the a-priori soft information provided by the SISO ECC decoder. The novel DFE technique uses a novel bit metric. Techniques are provided to identify a reduced size transmit symbol candidate set and generate from it near-optimal LLRs, also processing input a-priori LLRs in an iterative fashion.

19 Claims, 10 Drawing Sheets

OTHER PUBLICATIONS

Massimiliano Siti and Michael P. Fitz, "A novel soft-output layered orthogonal lattice detector for multiple antenna communications", Proc. IEEE Int. Conf. on Communications, Jun. 2006, pp. 6.

Requirements and recommendations for WiMAX ForumTM Mobility Profiles, WiMAX, Service Providers Working Group, Nov. 2005, pp. 34.

Mathini Sellathurai and Simon Haykin, "Turbo-BLAST for wireless communications: Theory and experiments", IEEE Transaction on Signal Processing, vol. 50, No. 10, pp. 2538-2546, Oct. 2002.

European Search Report based on European Application No. EP08172100, European Patent Office, Munich, Aug. 18, 2009.

Alessandro Tomasoni, Massimiliano Siti, Marco Ferrari and Sandro Bellini, "Turbo-Lord: a Map-approaching Soft-Input Soft-Output Detector for Iterative MIMO Receivers", IEEE Globecom 2007, pp. 3504-3508, XP031196593.

\* cited by examiner

ITERATIVE DETECTION AND DECODING IN MULTIPLE ANTENNA COMMUNICATION SYSTEMS

PRIORITY CLAIM

The instant application claims priority to European Patent Application No. 08172100.3, filed Dec. 18, 2008, which application is incorporated herein by reference in its entirety.

TECHNICAL FIELD

An embodiment of the present invention relates generally to communication technology and more specifically to systems for detecting symbols in multiple input multiple output (MIMO) communication systems.

More specifically, an embodiment of the present invention relates to the generation of bit soft-output information from the reception of symbols transmitted by multiple antenna sources.

In yet another embodiment, a method suitable for iterative detection and decoding schemes featuring a multiple antenna detector and a soft input soft-output error-correction-code decoder is proposed, which is able to output near-optimal bit soft information processing efficiently given input bit soft information.

BACKGROUND

Throughout this description various publications are cited as representative of related art. For the sake of simplicity, these documents will be referred by reference numbers enclosed in square brackets, e.g., [x]. A complete list of these publications ordered according to the reference numbers is reproduced in the section entitled "List of references" at the end of the description. These publications are incorporated by reference herein.

In digital transmission systems, one technique to transmit source bits is to group them into complex symbols representing the amplitude and phase of the signal modulating a frequency carrier. QAM (quadrature amplitude modulation) and PSK (phase shift keying) are examples. QAM (PSK) complex symbols are associated with m binary bits; overall, the way the bits are associated with the $M^2=2^m$ complex symbols is called "mapping", while the set of symbols is called a "constellation". For example, QPSK (quadrature phase shift keying) refers to 4 complex symbols representable through the two-bit values 00, 01, 10, 11 respectively. Similarly $M^2$-QAM constellation, e.g., 16-QAM, refers to the symbols originated by all possible groups of 4 bits 0000, 0001, 1100, etc. Gray mapping is a well-known example technique wherein two adjacent complex symbols represent group of bits differing by at most 1 bit. Complex symbols may be graphically represented in the complex plane where the two axes represent the in-phase (I) and quadrature-phase (Q) components of the complex symbol. FIG. 1 shows an example QPSK constellation, representing bits through Gray mapping rule, and a possible received symbol.

Digital data (bits or symbols) are transmitted through physical channels that normally corrupt them because of additive noise. Moreover in wireless systems, the experienced fading channel imposes distortion (i.e., phase and amplitude changes). For these reasons the received data may not coincide with the transmitted ones and an equalization technique may be used to estimate the transmitted data. Normally the channel coefficients are estimated prior to such equalization and assumed known by the equalizer. The robustness of a transmission link depends on the ability of the receiver to reliably detect the transmitted bits (i.e., transmitted 1s as 1s and 0s as 0s).

At the transmitter side, encoding through error correction codes (ECGs) is a common technique to increase the robustness of the link to noise corruption. At the receiver side it, implies the use of ECC decoders to correctly identify the transmitted bits.

ECC decoders typically provide better performance, i.e., are able to detect the originally transmitted bits with more reliability, if they process input bit "soft" decisions (i.e., probabilities of having received 1 or 0) rather than "hard" input (i.e., received bits already interpreted to be 1 or 0). Examples include the well-known soft-input Viterbi algorithm, Low Density Parity Check Codes (LDPCC), and Turbo Codes (TC). In wireless systems, soft decisions are computed based on the received symbol, the channel coefficient estimates, and the noise-variance estimate.

Wireless transmission through multiple antennas, also referred to as MIMO (Multiple-Input Multiple-Output), currently enjoys great popularity because of the demand of high data-rate communication from multimedia services. MIMO transmission includes of the simultaneous transmission of T complex symbols using T transmit antennas; this way a transmit data rate of T times the data rate of a single antenna system transmitting in the same bandwidth may be obtained. In the following, the sequence of T symbols simultaneously transmitted by the multiple antennas will be also referred to as "transmit sequence" or "transmit vector". In one example, each individual symbol is a sample of the mentioned PSK or QAM constellations. Normally $R \geq T$ receive antennas are employed to receive the transmit sequence. The R received symbols will be also referred to as "received sequence" or "vector" (of symbols or signals). FIGS. 2A and 2B illustrate example systems for MIMO transmission and reception.

Then, receivers for MIMO wireless receive as input at each receive antenna a signal made of the superposition of simultaneously transmitted symbols, each signal distorted by the channel and corrupted by noise. A schematic example of a MIMO system representation for two transmit and two receive antennas is shown in FIG. 3, where the multiple channel links, the transmit vector, and the received vector are evidenced.

Therefore a fundamental part of MIMO receivers is dedicated to perform "spatial equalization" meaning that starting from the input received vector and the channel coefficients estimates, the transmit sequence is estimated, or "detected". A method or apparatus implementing a technique to detect a transmit sequence is called a (MIMO) "detector" in the literature. If the output is an estimate $\hat{x}$ of the transmit sequence X of symbols, it is called a "hard output" (or a "hard decision") detector. If, in addition (or in alternative), it also generates bit soft-output information (or log-likelihood ratios, LLRs, in the logarithmic domain), as typically required in digital communications featuring soft-input ECC decoders, then the detector is said to be a "soft-output" detector. The two options are portrayed in FIGS. 4A and 4B respectively.

SUMMARY

An embodiment of the present invention is concerned with a method and apparatus to perform MIMO detection. Example systems of MIMO transmitters, and receivers including a MIMO detection apparatus, are portrayed in FIG. 5.

MIMO systems are often used in combination with multicarrier orthogonal frequency division multiplexing (OFDM).

OFDM systems correspond to dividing the overall information stream to be transmitted into many lower data-rate streams, each one modulating a different "sub-carrier" of the main frequency carrier. Equivalently, the overall bandwidth is divided into many sub-bands centered on the sub-carriers. This operation makes data communication more robust under wireless multi-path fading channel and simplifies frequency equalization operations. OFDM systems are well known to those skilled in the art. MIMO and OFDM are key technologies for significant wireless applications of commercial interest. Examples of typical MIMO-OFDM transmitters and receivers are depicted in FIG. 6.

Among others, a significant example of system endorsing MIMO and OFDM is provided by the next generation of Wireless Local Area Networks (W LANs), see e.g., the IEEE 802.11n standard [1]. Another candidate application is represented by mobile "WiMax" systems for fixed wireless access (FWA) [2]. Besides fourth generation (4G) mobile terminals will likely endorse MIMO technology and as such may represent a very important commercial application for an embodiment of the present arrangement.

An embodiment of the present invention is applicable to either single carrier or multi-carrier (e.g., OFDM) systems. The technical description throughout the present document is intended to be valid for either single carrier systems, or per-carrier in the frequency domain for multi-carrier systems.

Maximum-Likelihood (ML) detection may be considered an optimal detection technique in presence of additive white Gaussian noise (AWGN). The "brute force" ML detector finds an estimate of the transmit sequence by searching through all the possible transmit sequences until the best match to the received sequence is found. For example, in case of MIMO transmission of symbols belonging to an S sized PSK or QAM constellation and T transmit antennas, this corresponds to searching over $S^T$ transmit sequences; this means it becomes increasingly unfeasible with the growth of S and T, e.g., for S=64 (64-QAM) and T=2, $64^2$=4096 sequences of two symbols have to be searched in order to detect just two transmit symbols.

An interesting optimal (for T=2) and near-optimal (for T>2) performance MIMO detector, which significantly reduces the complexity of the search from $S^T$ to S·T, is described in the patent application [3], which is incorporated herein by reference in its entirety. Reference is also made to the related paper [6].

Another related challenging problem in this area is to improve the quality of the bit soft-output information generated by the MIMO detector in iterative receiver schemes featuring an outer soft-input-soft-output (SISO) module. Typically, such SISO modules are SISO ECC decoders. In the remainder of this document, reference will be made to SISO ECC decoders with no loss of generality, although it is intended that any other SISO outer module could be used. En example of a SISO ECC decoder widely used in wireless communications is the SISO Viterbi algorithm, which could be implemented according to the well known BCJR algorithm or the potentially suboptimal SOVA (soft-output Viterbi algorithm). Other examples include, but are not limited to, LDPCC and TC schemes.

In the above-mentioned iterative schemes, the soft information output by the ECC decoder is fed back as input to the MIMO detector and then processed, thus improving the soft information originally output by the detector. The process is repeated for a given number of iterations, according to a "turbo" decoding principle, in analogy to the iterative decoders first proposed for the Turbo Codes and the subsequent turbo equalization schemes to mitigate inter-symbol interference (ISI) in time-varying fading channels.

Such schemes will be also referred to as MIMO iterative-detection-and-decoding (IDD) schemes. Compared to non-iterative schemes, MIMO IDD schemes may offer a high-performance gain (increasing with the number of performed iterations), and as such represent a valuable option to be included in wireless communication receivers. A general block diagram of such a system is portrayed in FIGS. 7A and 7B. Such schemes feature as distinguishable units a detector 320 and a soft-output ECC decoder (also named forward error correction (FEC) code decoder) 322.

An example of a state-of-the-art MIMO IDD scheme is the soft interference cancellation (SIC) iterative technique described in [5], employing a MMSE detector and called by the authors "Turbo-BLAST". Unfortunately, this scheme may suffer from latency and complexity disadvantages, and also its performance may be significantly improved. Significant progress compared to the state of the art is included in the recent patent application [4], which is incorporated herein by reference.

An embodiment of the present invention proposes alternative methods to solve both the problems described in [3] and [4]. If used in non-iterative schemes, it provides performance and hardware-architecture properties comparable to [3]. However, one of its uses is for MIMO IDD schemes, wherein the embodiment provides near-optimal performance (comparable to [4]), but entails a lower hardware complexity than [4] thanks to an embodiment of a novel decision metric described in the remainder of the present document.

The following features may be highly desirable for a MIMO detection arrangement in order to be effective and implementable in next generation wireless communication procedures:

high (i.e., optimal or near-optimal) performance;
reduced overall complexity;
the capability of generating bit soft-output values, as this may yield a significant performance gain in wireless systems employing ECC coding and decoding procedures;
the capability of processing efficiently and with low complexity the soft information output by a SISO ECC decoder;
the capability of the architecture on which the procedure is implemented to be parallelized, which may be significant for an Application Specific Integrated Circuit (ASIC) implementation and also to yield the low latency potentially required by a real-time high-data rate transmission.

An embodiment of the present invention is potentially characterized by all the above listed advantages and as such may cover a key role of future MIMO wireless receivers.

One or more embodiments of the invention relate to a method, a corresponding apparatus (a detector and a related receiver), as well as a corresponding related computer-program product, loadable in the memory of at least one computer and including software-code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is intended to highlight the possibility for the method to be implemented in a distributed/modular fashion among software and hardware components.

An embodiment of the arrangement described herein is a detector wherein, if no information on the transmitted bit or symbols is available at the input to the detector, then the detector generates optimal (i.e., ML) or near-optimal bit soft-output information using two or more than two transmit antennas respectively.

Conversely, in arrangements where a detector and an outer SISO ECC decoder exist as distinguishable units, an embodiment of the present invention generates near-optimal bit soft-output information exploiting also the knowledge of input soft information of the transmitted bits from the outer SISO ECC decoder. Said bit soft-output information then represents a refined version of the soft information input to the detector (called "a-priori" in the literature as will be appreciated by those skilled in the art), and for this reason it is called "extrinsic" in the art. Extrinsic information is typically useful in iterative or "turbo" schemes featuring the detector, acting as an "inner" module, a deinterleaver, an outer module like, for example, a SISO ECC decoder, and optionally an interleaver and related deinterleaver on the feedback path. As mentioned previously, a general block diagram of such a system is portrayed in FIGS. 7A and 7B.

Simulation results and complexity estimates show that an embodiment of the invention is able to significantly enhance the performance of state-of-the-art wireless-communication receivers; specifically an embodiment of the invention is characterized by:

bit soft-output information quality very close to that of the optimal maximum-a-posteriori (MAP) technique (MAP is described below);

implementation complexity much lower than that of the impractical MAP, and in any case lower than the complexity of conventional soft-output MAP or near-MAP detectors;

a data flow characterized by a high degree of parallelism and thus potentially suitable for VLSI hardware architectures.

At a general level, it is intended that at least the three following options are considered as possible HW implementations for an embodiment of the present invention whose schematic principle is depicted in FIG. 7A or 7B:

1) data re-circulation using one HW instantiation of the loop may be performed with a clock having a higher frequency than the output data rate required by the considered application;

2) a pipelined HW structure built by cascading several instantiations, one per each iteration, of the forward path depicted in FIG. 7A or 7B followed by what is found in the feedback path. For example, referring to FIG. 7A, this implies that a single instantiation includes the series of inner detector, deinterleaver, outer decoder, interleaver. Compared to the HW structure reported in the immediately preceding paragraph (1): if N is the number of iterations, for a same clock frequency, N times higher speed (i.e., data rate) may be achieved at the expense of N times the HW complexity;

3) any combination of the HW structures reported in the immediately preceding paragraphs (1) and (2).

BRIEF DESCRIPTION OF THE DRAWINGS

For a more complete understanding of this disclosure and its features, reference is now made to the following description of one or more exemplary embodiments, taken in conjunction with the accompanying drawings.

DETAILED DESCRIPTION

FIGS. 1A through 10 and the various embodiments described in this disclosure are by way of illustration only and should not be construed in any way to limit the scope of the disclosure. Those skilled in the art will recognize that the various embodiments described in this disclosure may easily be modified and that such modifications fall within the scope of this disclosure.

Figure 1:
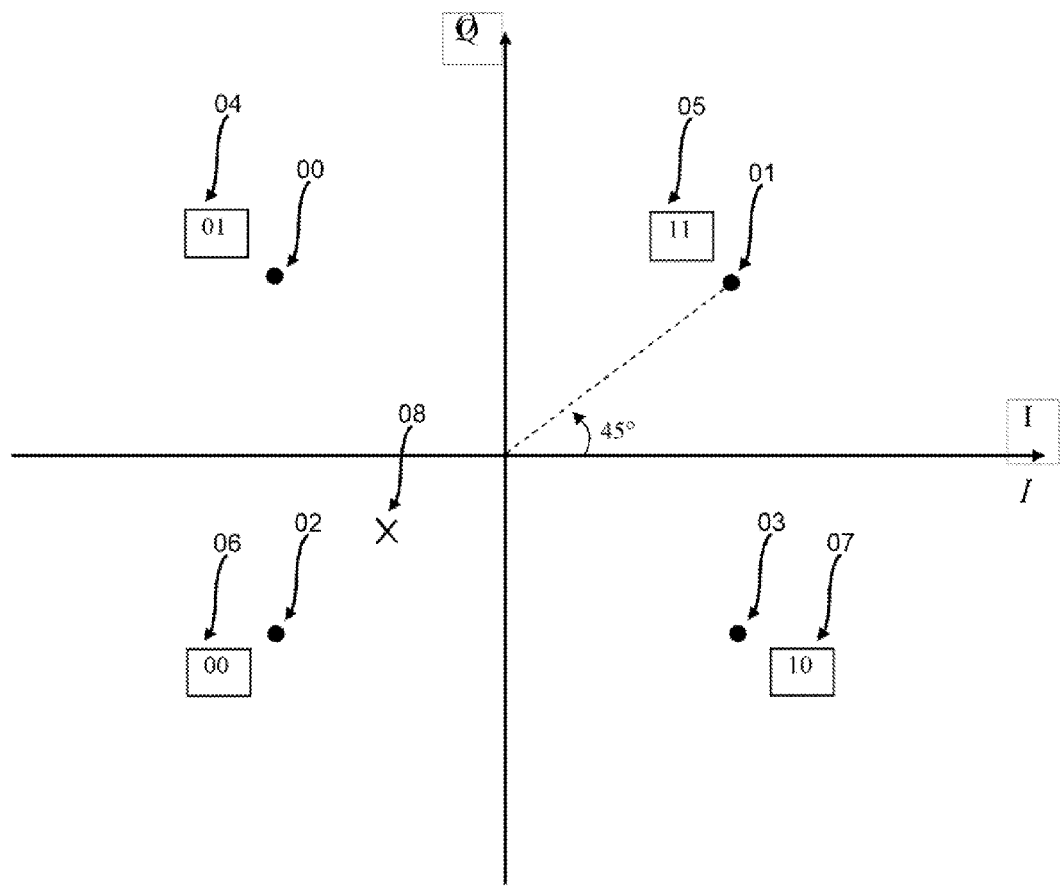
FIG. 1 illustrates an example of QAM constellation, bit mapping, and a possible received symbol.

FIG. 1 illustrates an example QPSK constellation, wherein the four constellations symbols are denoted 00 to 03. The corresponding Gray-mapped couple of bits are indicated in blocks 04 to 07. A possible received symbol 08 is also shown, which does not coincide with any transmit symbol due to the effect of noise and distortion caused by the channel.

Figure 2A:
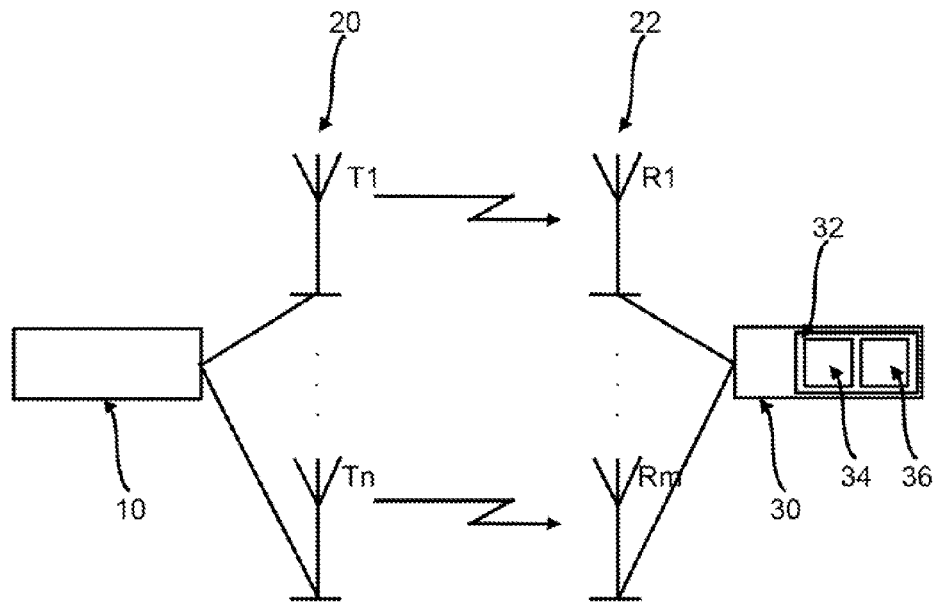
FIGS. 2A and 2B illustrate example systems for communicating and receiving from multiple sources in accordance with this disclosure.
Figure 2B:
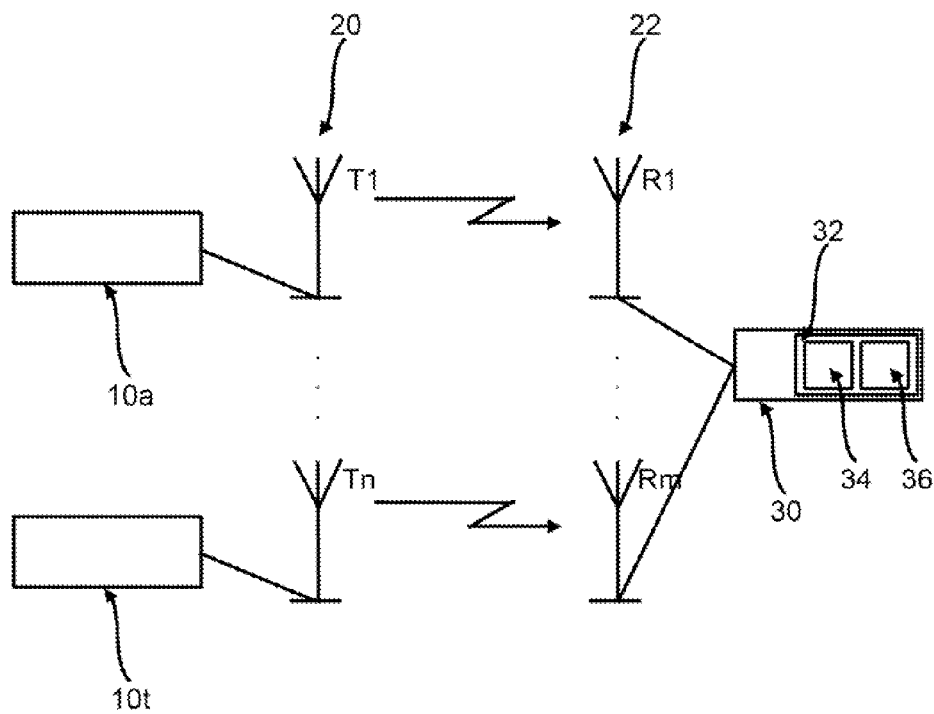

FIGS. 2A and 2B illustrate exemplary MIMO systems for communicating and receiving from multiple sources in accordance with this disclosure. In particular. These embodiments are for illustration only. Other embodiments of the systems could be used without departing from the scope of this disclosure.

As shown in FIG. 2A, the system includes a transmitter 10 and a receiver 30. The transmitter 10 includes or is coupled to multiple transmit antennas 20 (denoted T1-Tn), and the receiver 30 includes or is coupled to multiple receive antennas 22 (denoted R1-Rm). Typically, each receive antenna 22 receives signals transmitted simultaneously by all of the transmit antennas 20.

As shown in FIG. 2B, the system could also include multiple transmitters 10a-10t and the receiver 30. In this example, each of the transmitters 10a-10t includes or is coupled to a respective single transmit antenna 20.

Each of the transmitters 10, 10a-10t in FIGS. 2A and 2B represents any suitable device or component capable of generating or providing data for communication. The receiver 30 represents any suitable device or component capable of receiving communicated data.

In these examples, the receiver 30 includes an iterative detector and decoder 32, which detects transmit sequences of symbols from multiple sources and wherein the detector generates near-optimal bit soft-output information exploiting also the knowledge of input soft information from the outer SISO ECC decoder. The multiple sources could include a single transmitter 10 with multiple antennas 20, multiple transmitters 10a-10t with one or several antennas 20 each, or a combination thereof. The iterative detector and decoder 32 may operate as described in more detail below.

The block 32 includes any hardware, software, firmware, or combination thereof for detecting multiple communications from multiple sources. The block 32 could be implemented in any suitable manner, such as by using an Application Specific Integrated Circuit ("ASIC"), Field Programmable Gate Array ("FPGA"), digital signal processor ("DSP"), microprocessor or combination or subcombination thereof. As a particular example, the block 32 could include one or more processors 34 and one or more memories 36 capable of storing data and instructions used by the processors 34.

Figure 3:
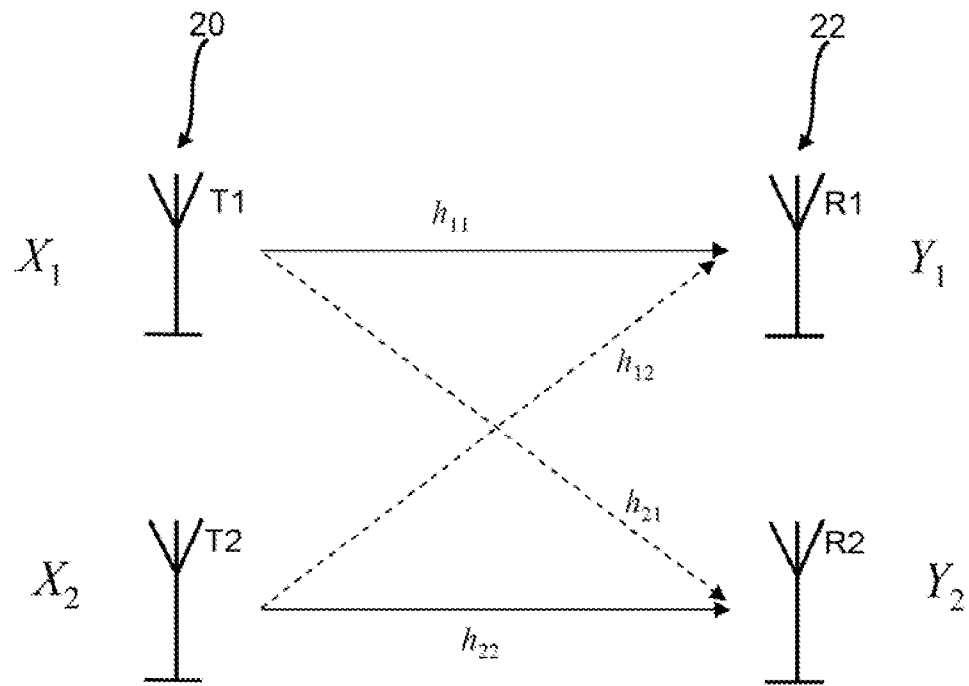
FIG. 3 illustrates a schematic MIMO system representation for two transmit and two receive antennas.

FIG. 3 illustrates a schematic MIMO system representation for two transmit and two receive antennas, in accordance with the expressions for $X[X_1, X_2], Y[Y_1, Y_2]$ and $H[h_{11}, h_{12}; h_{21}, h_{22}]$ reproduced therein, which may be valid either for both single-carrier flat fading MIMO systems or for wideband OFDM systems (in the latter case, per sub-carrier). The interpretation of equation (1) is that the signal received at each of the R antennas 22 represents the superposition of T simultaneously transmitted signals from antennas 20 corrupted by multiplicative fading and AWGN.

Figure 4A:
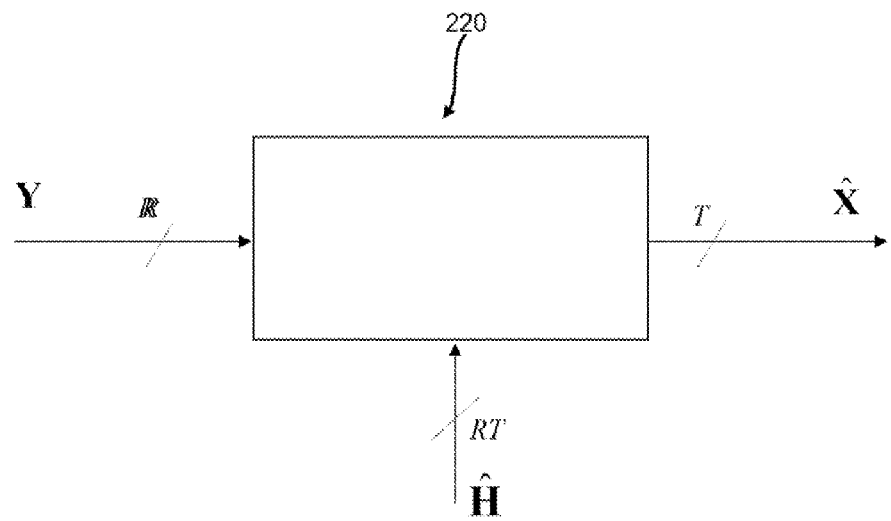
FIGS. 4A and 4B illustrate example systems for hard-output and soft-output MIMO detectors, respectively.
Figure 4B:
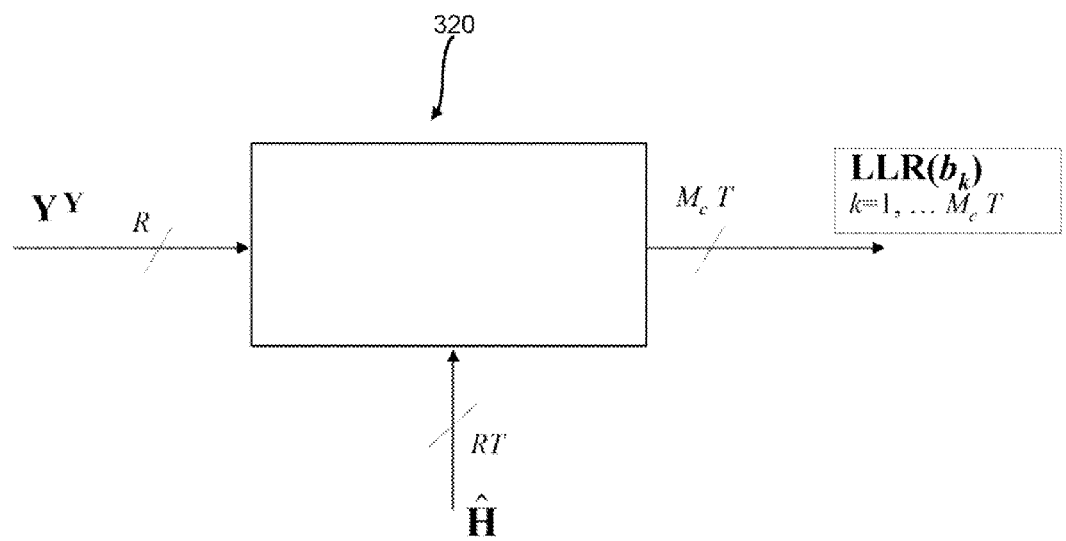

FIG. 4A illustrates an example hard-output MIMO detector 220 which outputs the estimates $\hat{x}$ of the transmit sequence X given as input the received sequence Y and the channel estimates $\hat{H}$. FIG. 4B illustrates an example soft-output MIMO detector 320 which outputs the bit LLRs corresponding to bits mapped onto the transmit sequence X, given as input the received sequence Y and the channel estimates $\hat{H}$.

Figure 5A:
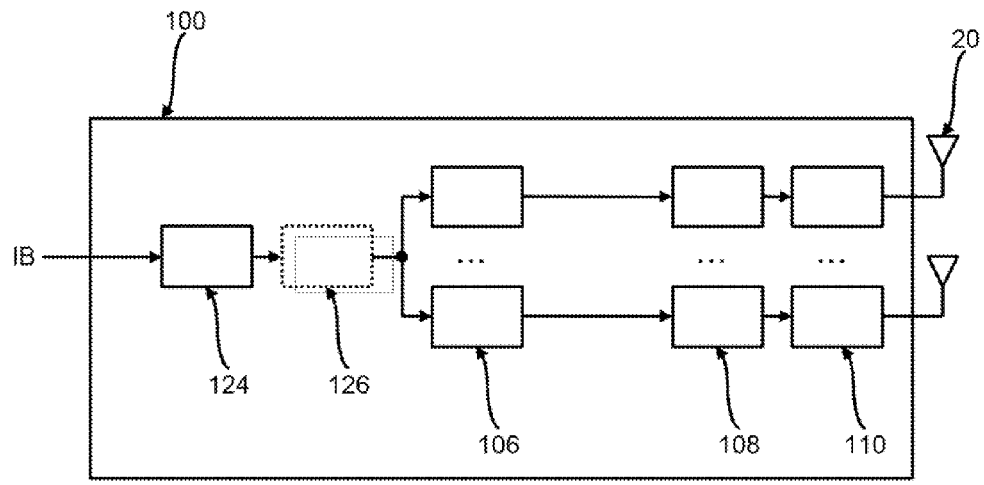
FIGS. 5A and 5B respectively illustrates a typical single-carrier MIMO transmitter and related receiver in accordance with this disclosure.
Figure 5B:
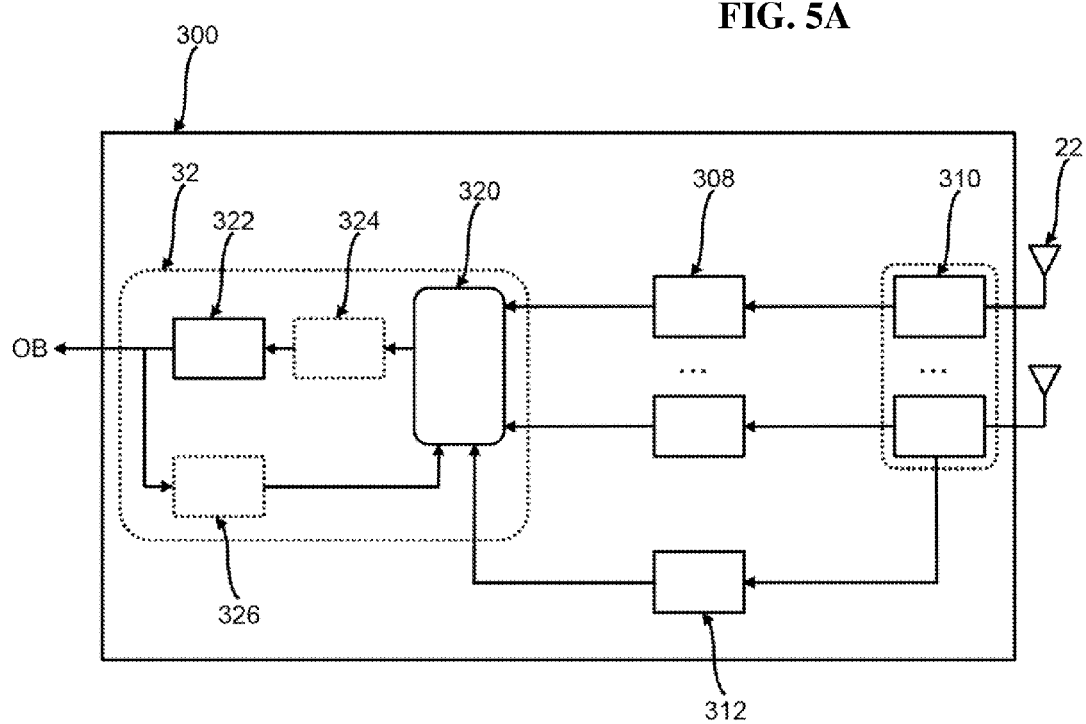

FIGS. 5A and 5B respectively illustrate a more detailed example of a single-carrier MIMO transmitter and receiver. Typical transmitter baseband digital elements/procedures are grouped as 100. As a counterpart, block 300 represents typical baseband elements/procedures of a receiver.

Referring to FIG. 5B, in particular, an embodiment of the iterative detection and decoder 32 (FIG. 2) includes as distinguishable units a MIMO detector 320, a deinterleaver 324, a FEC decoder 322 and an interleaver 326. Interleaver 326 is implemented according to the same permutation law as interleaver 126, the latter being at the transmitter side, with the difference that the interleaver 126 has a hard-decision bit input/output, while the interleaver 326 has a soft bit information input/output. Deinterleaver 324 implements the reciprocal permutation law of blocks 126 and 326. Blocks 324 and 326 are optionally present as components of block 32.

As well known to those skilled in the art, the block 100 further has associated there with a FEC encoder 124, and a set of mapper blocks 106, filter blocks 108 and digital-to-analog (D/A) converters 110 in order to convert an input bit stream IB for transmission over the set of transmission antennas 20.

Similarly the block 300 has additionally associated there with a set of analog-to-digital (ND) converters 310 and filter blocks 308 for each of the antennas 22 of the receiver, providing the received data to the detector 32, which creates the final output bit stream OB. Again those skilled in the art will appreciate the presence of a channel estimator 312 in the receiver block 300, which provides input channel estimation data to the MIMO detector 320. Any channel estimator may be used, and any forward error correction (FEC) code might be used in the FEC encoder 124 and FEC decoder 326, such as e.g., Reed-Solomon, convolutional, LDPCC, and TC schemes.

Again, these embodiments are for illustration only. Other embodiments of the systems 100, 300 and 32 may be used without departing from the scope of this disclosure.

The deinterleaver 324 and the interleaver 326 are optional in the sense that their usefulness depends on the adopted ECC. In some cases they could be eliminated without impairing the performance of the receiver.

Figure 6A:
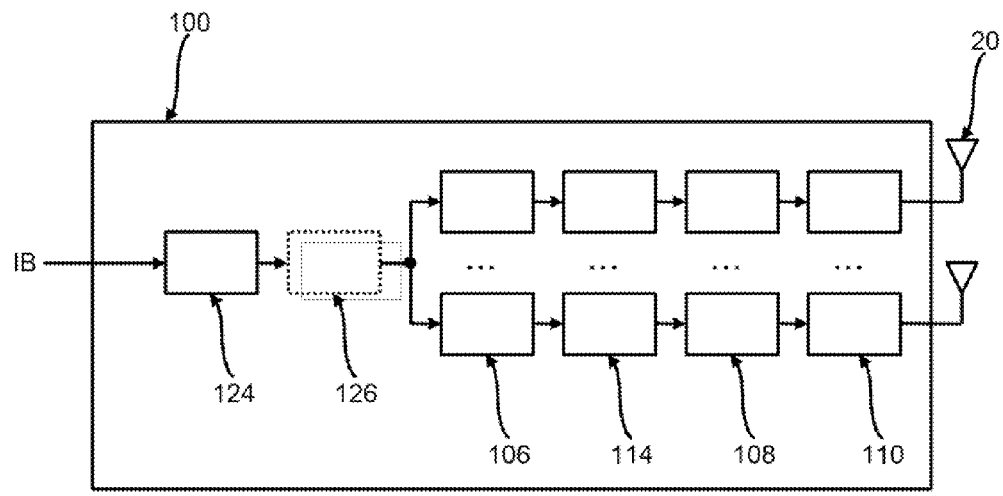
FIGS. 6A and 6B respectively illustrates a typical MIMO-OFDM transmitter and related receiver in accordance with this disclosure.
Figure 6B:
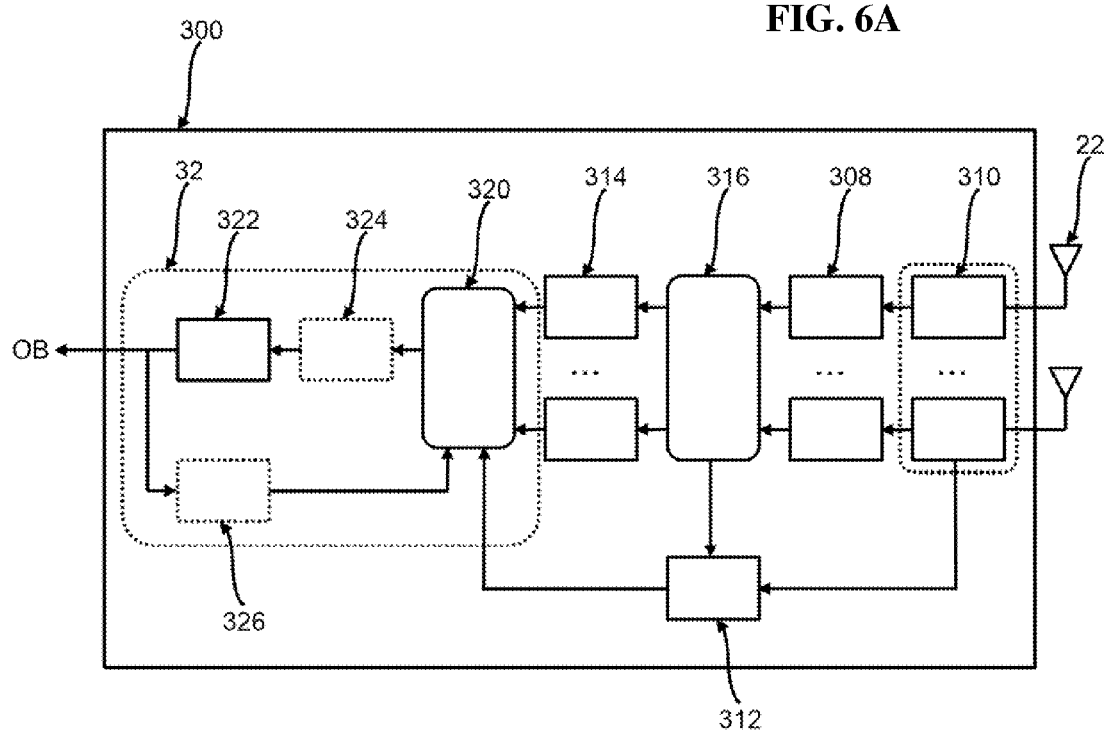

FIGS. 6A and 6B respectively illustrate alternative embodiments of a MIMO-OFDM transmitter and receiver. Again, typical transmitter baseband digital elements/procedures are grouped as 100 and typical receiver baseband elements/procedures are grouped as 300.

In comparison to the transmission system of FIGS. 5A and 5B, the system of FIGS. 6A and 6B further includes a set of framing and OFDM modulator blocks 114 at the transceiver side. As well known to those skilled in the art, a typical receiver further includes a synchronization block 316 for enabling a training-assisted coherent channel estimation by the block 312, as well as OFDM demodulator and deframing blocks 314.

Figure 7A:
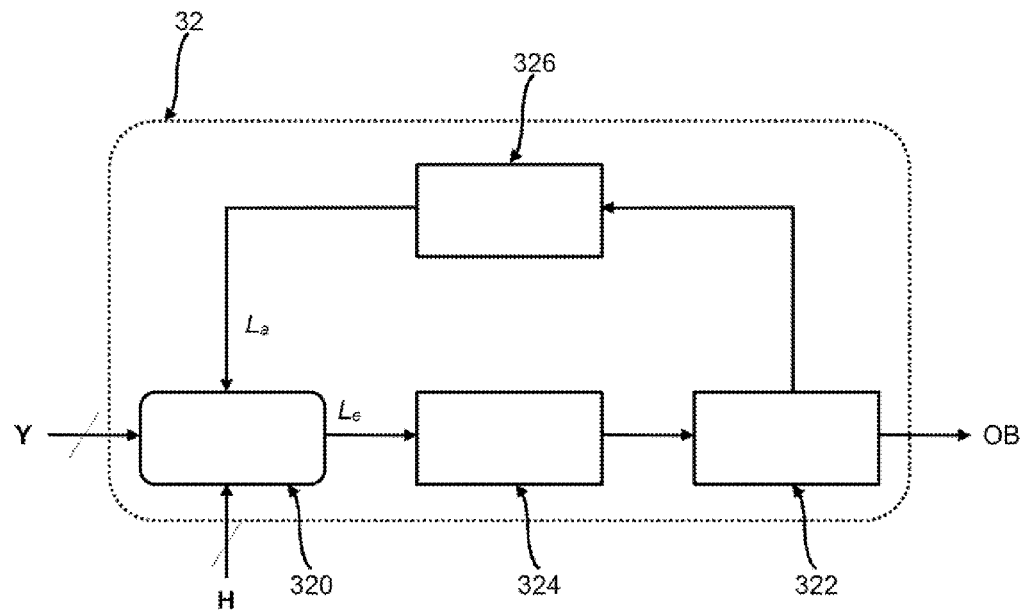
FIGS. 7A and 7B illustrate respective examples of two alternative single-carrier methods for computing a-posteriori soft-output information of multiple sources adapted for use in accordance with this disclosure.
Figure 7B:
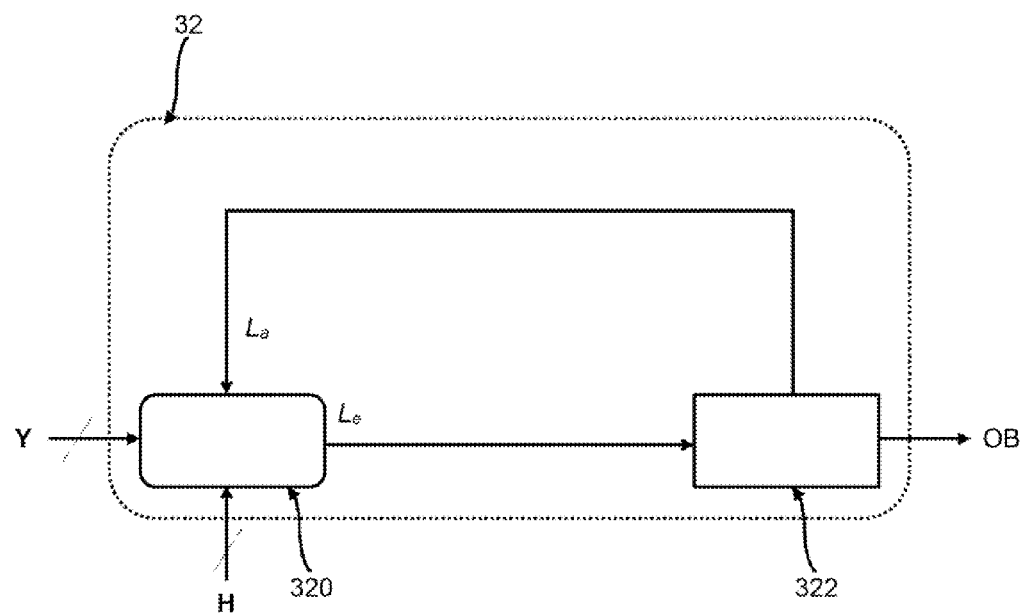

FIGS. 7A and 7B illustrate two alternative methods to implement the single carrier MIMO iterative detector and decoder 32. The MIMO detector 320 in both figures receives as input the received sequence Y and the estimated channel state information (CSI) H.

The deinterleaver 324 and the interleaver 326 are optional in the sense that their usefulness depends on the adopted ECC. In fact, FIG. 7B shows the same iterative loop as of FIG. 7A, however, without the interleaver 326 and deinterleaver 324. In some cases the interleaver 326 and the deinterleaver 324 could be eliminated without impairing the performance of the receiver.

The detector 320 receives as input the received signal $Y[Y_1, Y_2]$, as shown, e.g., in FIG. 3 the channel estimates, such as the channel estimation matrix H as shown in equation (1), and the a-priori bit soft information, such as the a-priori bit LLRs $L_a$, and then approximates internally the a-posteriori LLRs $L_p$ and outputs the extrinsic information $L_e$.

The flow is repeated for a given number of iterations and the decoder 322 determines the final output bit stream OB.

Figure 8A:
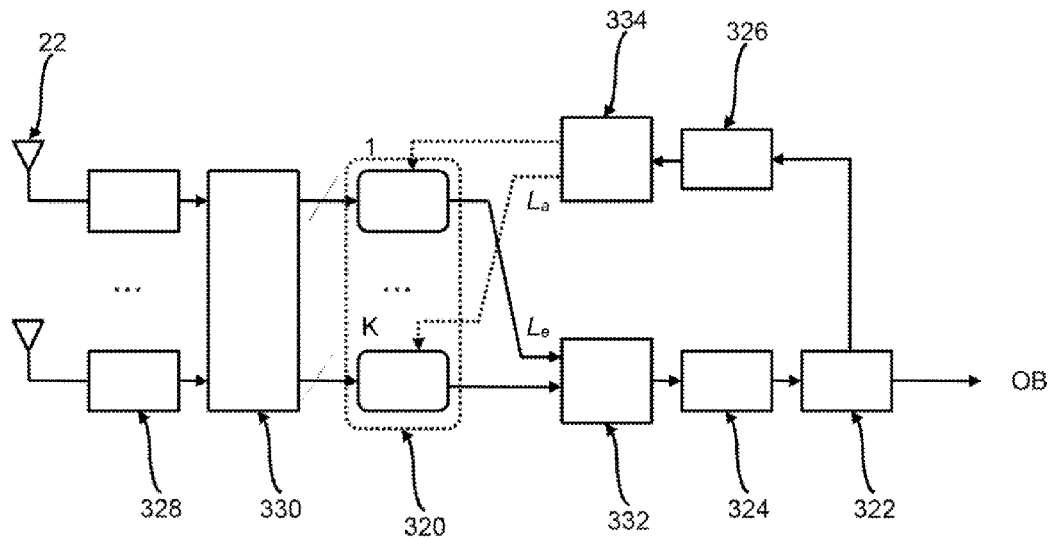
FIGS. 8A and 8B illustrate respective examples of two alternative OFDM methods for computing a-posteriori soft-output information of multiple sources for use in accordance with this disclosure.
Figure 8B:
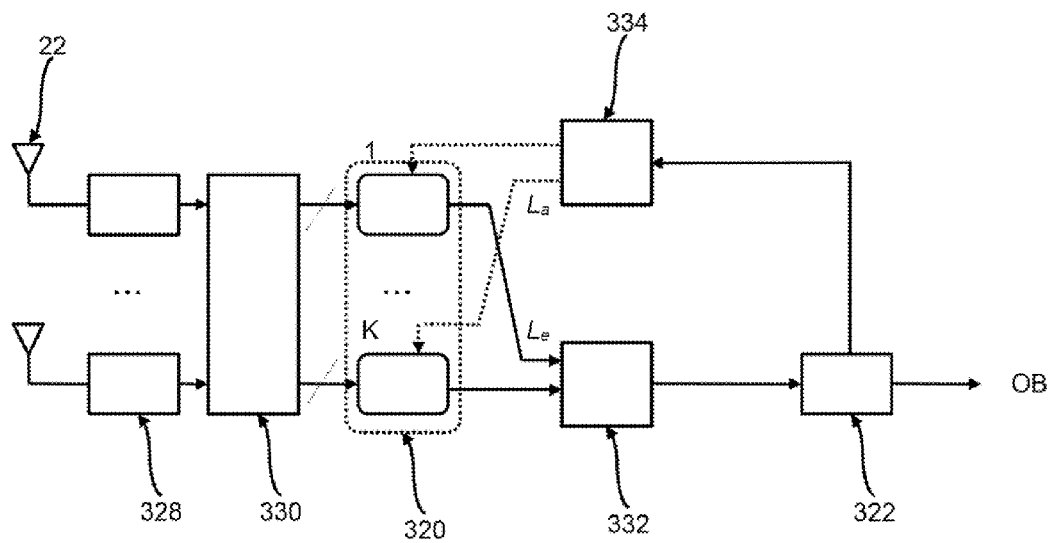

FIGS. 8A and 8B illustrate two alternative methods to implement the MIMO-OFDM iterative detection and decoder 32.

The MIMO detector 320 in both figures receives as input the received sequence Y and the estimated CSI H relatively to a set of OFDM subcarriers.

As well known to those skilled in the art, the time-domain data coming from the R antennas 22 of the receiver can be converted into K frequency domain Y vectors, one for each of the K OFDM subcarriers, e.g., by means of a set of Fast Fourier Transformation (FFT) blocks 328 and a multiplexer 330. The single-carrier case of FIGS. 5A, 5B, 7A, and 7B can be considered as a special case of such a system when K=1.

At least one detector block 320 then processes the K OFDM subcarriers. This can be done serially, in parallel by means of K detector blocks or any combination of both through N detectors blocks acting in parallel (with $1 \leq N \leq K$). The parallel structure represented in FIGS. 8A and 8B is considered as an example only and is not limiting. The outputs of the detector units 320 are then serialized by means of the parallel to serial (P/S) converter block 332.

FIG. 8A uses a deinterleaver 324 having as input the bit soft-output information output by the converter block 332, and a reciprocal interleaver 326 having as input the bit soft-output information output by a SISO FEC decoder 322.

The output of the interleaver 326 is demultiplexed by a serial-to-parallel (S/P) converter block 334 and fed back to the detector units 320 according to the OFDM subcarriers to which the soft bits output by 334 belong. The flow is repeated for a given number of iterations and the decoder 322 provides the output bit stream OB.

FIG. 8B shows the same scheme as FIG. 5A, except that the deinterleaver 324 and the reciprocal interleaver 326 are not present.

The linear complex baseband equation representative of narrow band MIMO system is:

$$Y = HX + N \quad (1)$$

where R and T are number of receive and transmit antennas respectively, Y is the received vector (size R×1), X the vector of transmitted complex constellation symbols (e.g., QAM or PSK) of size T×1, H is the R×T channel matrix, whose entries are the complex path gains from transmitter to receiver, samples of zero mean Gaussian random variables (RVs) with variance $\sigma^2 = 0.5$ per dimension. N is the noise vector of size R×1, whose elements are samples of independent circularly symmetric zero-mean complex Gaussian RVs with variance $N_0/2$ per dimension. $S = M^2$ is the complex constellation size. Equation (1) is considered valid per subcarrier for OFDM systems.

As previously said, ML detection may be considered to be optimal in presence of AWGN. If ideal CSI at the receiver is assumed, it corresponds to finding the estimate of the transmitted vector of signals X that represents the best match to the received sequence, i.e.:

$$\hat{X} = \underset{X}{\text{argmax}} - \|Y - HX\|^2 = \underset{X}{\text{argmin}} \|Y - HX\|^2 \quad (2)$$

$\|\bullet\|^2$ denotes the squared norm of the argument vector. As previously said this involves an exhaustive search over all the possible $S^T$ sequences of digitally modulated symbols, i.e., it becomes increasingly unfeasible with the growth of the spectral efficiency.

Because of their reduced complexity, sub-optimal linear detectors like Zero-Forcing (ZF) or Minimum Mean Square Error (MMSE) are widely employed in wireless communications.

In some cases knowledge of the probabilities to have transmitted a given sequence X may be available to the input of the detector. When this happens, in the literature it is said that "a-priori" information of X is available at the input of the detector.

A-priori information is typically provided to the detector by a SISO ECC decoder in iterative schemes.

If a-priori information on the transmit sequence X is available, the previously illustrated ML detection problem translates into a modified (and more complex) one, normally called Maximum-A-Posteriori (MAP) detection, which is the optimal detection scheme in presence of said a-priori information on X. If $M_c$ is the number of bits per modulated symbol, for every transmitted bit $b_k$, $k=1, \ldots, T \cdot M_c$ the MAP detector determines the bit value $b_k$ that maximizes the a-posteriori probability (APP) conditioned on the received channel symbol vector Y:

$$b_k = \arg\max P(b_k | Y)$$

The value of $b_k$ may be determined by comparing $P(b_k=1|Y)$ with $P(b_k=0|Y)$ i.e., computing the APP ratio:

$$\frac{P(b_k = 1 | Y)}{P(b_k = 0 | Y)}$$

Practically, this is commonly handled in the logarithmic domain. Using Bayes' rule the "a-posteriori" LLRs $L_{p,k}$ are computed as $$L_{p,k} = \ln \frac{P(b_k=1|Y)}{P(b_k=0|Y)} = \ln \frac{\sum_{X \in S_+^k} p(Y|X) p_a(X)}{\sum_{X \in S_-^k} p(Y|X) p_a(X)} \quad (1)$$

Practically, this is commonly handled in the logarithmic domain. Using Bayes' rule the "a-posteriori" LLRs Lp,k are computed as where $S+^k$ is the set of $2^{T \cdot Mc-1}$ bit sequences having $b_k=1$, and similarly $S-^k$ is the set of bit sequences having $b_k=0$. $p_a(X)$ represent the a-priori probabilities of X. They can be neglected if equiprobable symbols are considered—which is the usual assumption when no a-priori information is available, and in this case equation (3) reduces to the ML metric.

Also, one has:

$$p(Y|X) \propto \exp\left[-\frac{1}{2\sigma_N^2} \|Y - HX\|^2\right]$$

through a proportionality factor that may be neglected when substituted in (3) and where $\sigma_N^2 = N_0/2$.

Denoting with $L_{a,j}$ the LLRs output by the decoder of the j-th bit in the transmitted sequence X, i.e., the a-priori (logarithmic) bit probability information, and considering an independent bit in a same modulated symbol, equation (3) may be further developed as:

$$L_{p,k} = \ln \frac{\sum_{X \in S_+^k} \exp\left(-\frac{1}{N_0} \|Y - HX\|^2 + \sum_{j=1}^{TM_C} b_j(X) \frac{L_{a,j}}{2}\right)}{\sum_{X \in S_-^k} \exp\left(-\frac{1}{N_0} \|Y - HX\|^2 + \sum_{j=1}^{TM_C} b_j(X) \frac{L_{a,j}}{2}\right)} \quad (4)$$

where $b_j(X) = \{\pm 1\}$ indicates the value of the j-th bit in the transmitted sequence X in binary antipodal notation.

From equation (4) the following metric may be identified:

$$D(x) = -\frac{1}{N_0} \|Y - HX\|^2 + \sum_{j=1}^{TM_C} b_j(X) \frac{L_{a,j}}{2} = D_{ED} + D_a \quad (5)$$

wherein $$D_{ED} = -\frac{1}{N_0} \|Y - HX\|^2, \quad D_a = \sum_{j=1}^{TM_C} b_j(X) \frac{L_{a,j}}{20}$$

$D_{ED}$ being the Euclidean distance (ED) term and $D_a$ the a-priori term. The summation of exponentials involved in equation (5) is usually approximated according to the so-called "max-log" approximation:

$$\ln \sum_X \exp(D(X)) \cong \ln \max_X \exp[D(X)] \qquad (6)$$

then equation (4) may be re-written as:

$$L_{p,k} \cong \max_{X \in S_+^k} D(X) - \max_{X \in S_-^k} D(X) \qquad (7)$$

corresponding to the so-called max-log-MAP LLRs. To conclude the description of the ideal detector, the a priori information $L_{a,k}$ is subtracted from $L_{p,k}$, so that the detector outputs the extrinsic information $L_{e,k}$ to be passed to an outer decoder:

$$L_{e,k} = L_{p,k} - L_{a,k} \qquad (8)$$

Unless otherwise stated, the description herein deals with probability ratios in the logarithmic domain, i.e., LLRs represent the input-output soft information, but the same ideas and procedures may be generalized in a straightforward manner to the case of regular probabilities.

Also MAP—as well as ML—detection and soft-output generation involves an exhaustive search over all the possible $S^T$ sequences of digitally modulated symbols. The most popular state-of-the-art sub-optimal techniques to approximate MIMO MAP soft-output computation use the principle of IDD, employing suboptimal MIMO detectors like e.g., MMSE or ZF or List detectors (like e.g., the Sphere Decoder, SD).

The arrangement described herein deals with a simplified yet near-optimal method to compute $$\tilde{X} \cong \arg\max_X D(X) \qquad (9)$$

by using the principle of IDD and employing a novel MIMO detection process instead of the state-of-art MMSE, ZF or SD, and where $D(X)$ is given by equation (5). This result may then be used to solve either equation (2) (hard-output detection) or equation (7) (soft-output generation).

More specifically, even though the arrangements of this disclosure are able to operate also in the absence of a-priori information, i.e., $L_{a,j}=0$ in equation (5), embodiments of the invention provide for a MIMO detector solving the more challenging problem of calculating the LLRs (7) when a-priori information (i.e., $L_{a,j}\neq 0$) is provided by a SISO ECC decoder, near optimally and with much lower complexity than the impractical MAP. It should be recalled that processing efficiently the "a-priori" information is a part of IDD schemes. Those skilled in the art will anyway appreciate that in the case of $L_{a,j}=0$ the modifications and optimizations to be brought to the embodiments described in the following are straightforward.

Those skilled in the art will appreciate that calculating $D(X)$ for X means calculating a metric for the sequence of transmitted symbols. Similarly, solving equation (9) means estimating the sequence that maximizes the metric $D(X)$.

Moreover, calculating $D(X)$ according to equation (5) in particular means calculating an a-posteriori probability metric, that also includes the steps of summing an Euclidean distance term to the a-priori probability term for the selected candidate sequences X.

The embodiments of the invention described herein concern processing steps for a MIMO IDD scheme. In the remainder of this document reference will be made to the operations and steps to be comprised in a single iteration, being understood that the MIMO detection process may end, and the source information bits may hard decoded, after a given number (greater than or equal to 1) of iterations is performed. It should be understood that the term iterations or stages are exchangeable, because the arrangement could be implemented by a single detector and decoder block iterating on the various data or by several detector and decoder blocks being connected in a cascaded structure such as, e.g., a pipelined structure.

An embodiment of a single IDD iteration or stage includes at least the following processing steps:

in a first step the MIMO detector outputs soft information ($L_e$) based on the input received vector Y and the input CSI estimates of H, and without processing any a-priori information (i.e., $L_a=0$); the output LLRs $L_e$ ($=L_p$ in this case, cfr. equation (8)) are input to a SISO ECC decoder and in a second step the SISO ECC decoder outputs a-priori LLRs ($L_a$) which are then input back to the MIMO detector to generate a second version of the outputs soft information ($L_p'$, in place of $L_p$), computed processing also $L_a$ besides said Y and said H, and in a third step said a-priori LLRs $L_a$ are subtracted from said $L_p'$ to generate an improved version of the extrinsic information ($L_e'$, in place of $L_e$), to be input to the SISO ECC decoder.

If further iterations are to be performed the three processing steps above are to be repeated. After a given desired number of iterations has been performed, a hard-decision on the bit value is finally taken by the ECC decoder.

The arrangement described herein deals with the problem of bit soft-output generation through a "search" of the candidate symbols transmitted in turn by each transmit antenna, or layer. This means that even if for the sake of conciseness the following processing steps are described with reference to a generic transmit antenna t, the related processing is intended to be repeated for T times with t=1, . . . T respectively. In the remainder of this document the terms antennas or layers will be used interchangeably. Numbering and disposing the antenna or layers according to a given integer number sequence refers to, during the detection process, ordering the complex symbols $X_k$ of the transmit sequence X and the associated channel column $h_k$ of the matrix H, according to the mentioned layer sequence.

More precisely, generating bit soft-output information for the bits corresponding to the symbols transmitted by all the antennas comprises repeating the considered steps and operations a number of times equal to the number of transmit antennas, each time associated with a different disposition of layers, each layer being a reference layer in only one of the dispositions, and disposing the columns of the channel matrix accordingly prior to further processing. The meaning of 'reference layer' will be clear from the following descriptions.

In an embodiment, the problem is decoupled in turn for the different transmit antennas through a "channel triangularization" process, and a reference transmit symbol or layer ($X_t$ for the t-th antenna) is selected. More precisely, the reference layer corresponds to the last entry of the considered layer disposition, and consequently the transmit symbol $X_t$ is placed in the last position (i.e., the T-th) in the sequence (or vector) X. As clear from the description in the following, $X_t$ also corresponds to the last row of the triangularized channel matrix. The symbol $X_t$ represents a reference transmit symbol, and its possible values represent candidate values to be "searched" and used in the demodulation scheme.

The complex modulated symbol $X_t$ spans all the possible (QAM or PSK) complex constellations S, or a properly selected subset thereof, denoted by C, with cardinality $S_C$.

For each of the $S_C$ possible values $X_t = \overline{X}$, a unique transmit sequence X, denoted with $U_t(\overline{X})$, is determined. Each said sequence of transmitted symbols $U_t(\overline{X})$ is then obtained by grouping together (i.e., listing in sequences of T symbols) the candidate value of the reference symbol, $X_t = \overline{X}$, and one further estimated sequence of the remaining (i.e., other than the candidates) transmitted symbols. How to estimate such sequences is detailed in the exemplary embodiments.

Then, overall T subsets $U_t(\overline{X})$ are determined ($1 \leq t \leq T$). Each subset has per iteration cardinality $S_C$, with $S_C \leq 2^{M_c}$; therefore the ensemble of the T subsets has a cardinality no larger than $T2^{M_c}$, as opposed to the size $S^T = 2^{TM_c}$ of the set of all possible transmit sequences used e.g., by a brute force ML or MAP detector.

The set $U_t$ used to compute the bit LLRs relative to $X_t$ is then built by grouping the sequences as function of all $\overline{X} \in C$, i.e.:

$$U_t = \left\{ \bigcup_{\forall \overline{X} \in C} U_t(\overline{X}) \right\} \quad (10)$$

It is remarked that an embodiment may output a hard-decision estimate of X obtained as:

$$\hat{X}^t = \underset{\overline{X} \in C}{\mathrm{argmax}}\{D(U_t(\overline{X}))\} \quad (11)$$

An embodiment of the invention approximates equation (7) at every iteration using an updated version of the metric D(X), through:

$$L_{p,i} \cong \max_{X \in U_t^j(1)} D(X) - \max_{X \in U_t^j(0)} D(X) \quad (12)$$

where $U_t^j(1)$ and $U_t^j(0)$ are a set partitioning of $U_t$:

$$U_t^j(a) = \{X \in U_t : b_{M_c(t-1)+j}(X) = a\}, a = \{0,1\}, \quad (13)$$

and where t is the t-th antenna with $1 \leq t \leq T$, j the j-th bit in the modulated symbol with $1 \leq j \leq M_c$, and i denotes the i-th bit in the sequence output by the detector with $i = M_c(t-1) + j$.

Those skilled in the art will appreciate that calculating equation (12) corresponds to calculating a-posteriori bit soft-output information ($L_p$) for the selected sequences (X) from the set of metrics for the sequences D(X).

The process is repeated for a number of iterations, each time using an updated version of the a-priori LLRs $L_a$ output by the decoder.

Specifically, at every stage, an updated a-posteriori information $L_p$ may be calculated from the a-priori information $L_a$ according to equation (7), and the desired extrinsic LLRs $L_e$ may be calculated by subtracting the updated a-posteriori LLRs $L_p$ from the a-priori LLRs $L_a$ as shown in equation (8).

Channel Processing

In order to decouple the problem in turn for the different transmit antennas and efficiently determine T subsets $U_t$, one for each transmit antenna, it is useful to perform a channel matrix "triangularization" process, meaning that through proper processing it is factorized in two or more product matrices one of which is triangular. It is understood that different matrix processing may be applied to H. Examples include, but are not limited to, QR and Cholesky decomposition procedures.

It is well-known to those skilled in the art that performing a Cholesky decomposition of complex channel state information matrix requires:

forming a Gram matrix using the channel state information matrix;

performing a Cholesky decomposition of the Gram matrix, and calculating the Moore-Penrose matrix inverse of the channel state information matrix, resulting in a pseudoinverse matrix.

This pseudoinverse matrix may then be used to process a complex vector of received sequences of digitally modulated symbols by multiplying the pseudoinverse matrix by the received vector.

In the following reference will be made to QR decomposition, without loss of generality.

Based on what was previously said, the following equations will be written for the generic t-th layer disposition where the symbol $X_t$ under investigation corresponds to the last position in the sequence X. It is intended that the method described herein requires computing T times the following equations, for T different dispositions of layers corresponding to the transmitted symbols, each layer being a reference layer in only one of the dispositions, and disposing the columns of the channel matrix accordingly prior to further processing.

Specifically, if $\Pi_t$ is a permutation matrix which circularly shifts the elements of X (and correspondingly the order of the columns of H), such that the symbol $X_t$ under investigation moves to the last position in the sequence X, T different QR decompositions are performed, one for each $\Pi_t$:

$$H\Pi_t^T = Q_t R_t \quad (14)$$

where $Q_t$ is an orthonormal matrix of size R×T and $R_t$ is a T×T upper triangular matrix.

The ED metrics in equation (5) may be equivalently rewritten as:

$$\begin{aligned} D_{ED} &= -\frac{1}{N_0}\|Y - HX\|^2 \\ &= -\frac{1}{N_0}\|Y - Q_t R_t \Pi_t X\|^2 \\ &= -\frac{1}{N_0}\|Q_t^H Y - R_t \Pi_t X\|^2 + C \\ &= -\frac{1}{N_0}\|Y_t' - R_t X_t'\|^2 + C \end{aligned} \quad (15)$$

where $Y_t' = Q_t^H Y$, $X_t' = \Pi_t X$ and C is a constant term arising when R>T and which affects neither equation (2) nor equation (7).

It is useful to enumerate the rows of $R_t$ from top to bottom and create a correspondence with the different transmit antennas (or layers), ordered as in $X_t'$. Then the QAM symbol $X_t$ is located in the T-th position of $X_t'$ and corresponds to the last row of $R_t$, which acts as an equivalent triangular channel.

The Demodulation Process

In the following it will be described an embodiment able to select the sequences $U_t(\overline{X})$ in an efficient way. Specifically, the selection can be regarded as a modified spatial decision feedback equalization (DFE) process where:

the complex modulated symbol $X_t$ spans all the possible (QAM or PSK) constellation symbols, or a properly selected subset C thereof;

for each of the remaining T−1 layers, a unique candidate complex symbol is determined through a novel DFE process;

said novel DFE process uses a novel metric which requires demapping of the bits associated with the possible transmitted symbols, and is able to process efficiently the a-priori LLRs$_{La}$;

The resulting overall complexity of the demodulation process is characterized by a significantly reduced complexity compared to the optimal max-log-MAP.

By specializing equation (5) for the different layers from T−1 to 1 after each channel triangularization has been computed (i.e., using equation (15)), the "partial" APP metric for layer j may be written as:

$$D_{p,j}^t(\overline{X}_j^t) = -\frac{1}{N_0}\left|Y_j^t - r_{j,j}^t \overline{X}_j^t - \sum_{k=j+1}^{T} r_{j,k}^t X_k^t\right|^2 + \sum_{i=1}^{M_C} b_i(\overline{X}_j^t)\frac{L_{a,i}(\overline{X}_j^t)}{2} \quad (16)$$

In order to simplify the notation will be denoted in the following simply as X and equation (16) may be rewritten as $$D_{p,j}^t(X) = D_{p,ED}(X) + D_{p,a}(X) \quad (17)$$

$$= -\frac{1}{N_0}\left|\hat{Y}_j^t - r_{j,j}^t X\right|^2 + \sum_{i=1}^{M_C} b_i \frac{L_{a,i}(X)}{2}$$

with $$D_{p,ED}(X) = -\frac{1}{N_0}\left|\hat{Y}_j^t - r_{j,j}^t X\right|^2,$$

and $$D_{p,a}(X) = \sum_{i=1}^{M_C} b_i \frac{L_{a,i}(X)}{2}$$

where $$\hat{Y}_j^t = Y_j^t - \sum_{k=j+1}^{T} r_{j,k}^t X_k^t$$

and bi denotes the i-th bit belonging to symbol X.

It is noted that even if all $\overline{X} \in C$ are searched for the reference layer, it is not straightforward to determine one symbol X at a time from layer 1 to T−1 through the spatial DFE process described in [3] and [6], because of the additional correction term represented by the a-priori information, also a function of the candidate symbol for X. This implies that even if the candidate symbols for the upper layers (indexes from j+1 to T in the summation) have already been selected maximizing separately each contribution (16), an exhaustive search of all possible constellation symbols $\overline{X}_j^t$ would still be required at the j-th layer. Using T transmit antennas, and setting for instance C≡S, this would lead to a number of searched candidate mapped symbols in the order of $$N = T(T-1)2^{2M_c} \quad (18)$$

which is very high and in particular in case of T=2 would correspond to the optimal MAP algorithm.

First, the complex symbol set C is partitioned into disjoint subsets as a function of the value of the bits mapped onto X. For simplicity the generic symbol transmitted from layer j with $1 \leq j \leq T-1$ is indicated as X. First, the initial set is set to $T_1 \equiv C$. The initial set is then partitioned into two sub-sets according to the most significant bit (MSB) value of X:

$$T_1^+ = \{X \in T_1 : b_1(X) = +1\}, T_1^- = \{X \in T_1 : b_1(X) = -1\}$$

Then a metric $\mu_1 = \mu_{ED,1} + \mu_{a,1}$ is computed over the two sub-sets $T_1^+$ and $T_1^-$, denoted in the following as $\mu_1^+$ and $\mu_1^-$, respectively:

$$\mu_{ED,1}^\pm = \frac{1}{2^{M_c-1}}\sum_{X \in T_1^\pm} D_{p,ED}(X) \quad (19)$$

$$= \left(-\frac{1}{2^{M_c-1}N_0}\right)\sum_{X \in T_1^\pm} \left|\hat{Y}_j^t - r_{j,j}^t X\right|^2$$

and $$\mu_{a,1}^\pm = \frac{1}{2^{M_c-1}}\sum_{X \in T_1^\pm} D_{p,a}(X) \quad (20)$$

$$= \sum_{k=1}^{M_c} \frac{L_{a,k}}{2}\left[\frac{1}{2^{M_c-1}}\sum_{X \in T_1^\pm} b_k(X)\right]$$

Subsequently, the MSB is decided according to the sign of the difference $$\Delta\mu_1 = \Delta\mu_{ED,1} + \Delta\mu_{a,1} \quad (21)$$

where $$\Delta\mu_{ED,1} = \mu_{ED,1}^+ - \mu_{ED,1}^- \quad (22)$$

$$= \left(\frac{1}{2^{M_c-1}N_0}\right)\left[-\sum_{X \in T_1^+}\left|\hat{Y}_j^t - r_{j,j}^t X\right|^2 + \sum_{X \in T_1^-}\left|\hat{Y}_j^t - r_{j,j}^t X\right|^2\right]$$

and $$\Delta\mu_{a,1} = \mu_{a,1}^+ - \mu_{a,1}^- = L_{a,1} \quad (23)$$

More specifically, in an embodiment the MSB is determined according to the following decision rule:

$$b_1 \equiv \begin{cases} 1 & \text{if } \Delta\mu_1 > 0 \\ -1 & \text{if } \Delta\mu_1 < 0 \end{cases} \quad (24)$$

Specifically, in an embodiment, the decision rule as shown in equation (24) is used to determine the set of symbols to be considered for $b_2$:

$$T_2 \equiv \begin{cases} T_1^+ & \text{if } \Delta\mu_1 > 0 \\ T_1^- & \text{if } \Delta\mu_1 < 0 \end{cases}$$

Then the steps described in the foregoing are repeated, i.e., first the metrics $\mu_2^+$ and $\mu_2^-$ are computed over $T_2^+$ and $T_2^-$, respectively:

$$T_2^+ = \{X \in T_2 : b_2(X) = +1\}, T_2^- = \{X \in T_2 : b_2(X) = -1\}$$

and so forth.

In general terms, for the n-th bit $b_n$, with $1 \leq n \leq M_c$, the set $T_n$ may be partitioned in two disjoint sub-sets:

$$T_n^+ \equiv \{X \in T_n : b_n(X) = +1\},$$

$$T_n^- \equiv \{X \in T_n : b_n(X) = -1\} \quad (25)$$

It is noted that the cardinality of the candidate set is halved at every step, i.e., $$\operatorname{card}(T_{n+1}) = \operatorname{card}(T_n^\pm) = \frac{1}{2}\operatorname{card}(T_n) \quad (26)$$

$$\Rightarrow \operatorname{card}(T_n) = \frac{1}{2^n}\operatorname{card}(T_1) = 2^{M_c - n + 1}$$

The metric $\mu_n = \mu_{ED,n} + \mu_{a,n}$ may then be computed by averaging $D_{p,ED}$ and $D_{p,a}$ over $T_n^+$ and $T_n^-$ as:

$$\mu_{ED,n}^\pm = \frac{1}{2^{M_c - n}} \sum_{X \in T_n^\pm} D_{p,ED}(X) \quad (27)$$

$$= \left(-\frac{1}{2^{M_c - n} N_0}\right) \sum_{X \in T_n^\pm} |\hat{Y}_j^t - r_{j,j}^t X|^2$$

$$\mu_{a,n}^\pm = \frac{1}{2^{M_c - n}} \sum_{X \in T_n^\pm} D_{p,a}(X) \quad (28)$$

$$= \sum_{k=1}^{M_c} \frac{L_{a,k}}{2} \left[\frac{1}{2^{M_C - n}} \sum_{X \in T_n^\pm} b_k(X)\right]$$

Finally, the bit $b_n$ may be decided according to the sign of the difference $$\Delta \mu_n = \Delta \mu_{ED,n} + \Delta \mu_{a,n} \quad (29)$$

i.e., $$b_n \equiv \begin{cases} 1 & \text{if } \Delta \mu_n > 0 \\ -1 & \text{if } \Delta \mu_n < 0 \end{cases} \quad (30)$$

where $$\Delta \mu_{ED,n} = \mu_{ED,n}^+ - \mu_{ED,n}^- \quad (31)$$

$$= \frac{1}{2^{M_C - n} N_0}\left[-\sum_{X \in T_n^+} |\hat{Y}_j^t - r_{j,j}^t X|^2 + \sum_{X \in T_n^-} |\hat{Y}_j^t - r_{j,j}^t X|^2\right]$$

and $$\Delta \mu_{a,n} = \mu_{a,n}^+ - \mu_{a,n}^- = L_{a,n} \quad (32)$$

The search set for the next bit may be determined as:

$$T_{n+1} \equiv \begin{cases} T_n^+ & \text{if } \Delta \mu_{ED,n} > 0 \\ T_n^- & \text{if } \Delta \mu_{ED,n} < 0 \end{cases} \quad (33)$$

The process is repeated iteratively for all the bits $b_n$ mapped onto X. Once all the bits are determined, the corresponding modulated symbol X may be computed through the mapping rules chosen for the system under consideration.

The estimated symbol X may then be used to compute the partial APP metric (16) and stored.

Once all symbols transmitted from layer j with $1 \leq j \leq T-1$ have been estimated, the overall sequence $U_t(\overline{X})$ may be stored and the related associated metric $D(\overline{X})$ (5) may be computed for $\overline{X} \equiv U_t(\overline{X})$ by summing the partial contributions (16) for all layers, and the so-determined metric value can also be stored.

Once all symbols transmitted from layer j with $1 \leq j \leq T-1$ have been estimated, the overall sequence can be stored and the related associated metric $D(\overline{X})$ (5) can be computed for by summing the partial contributions (16) for all layers, and the so-determined metric value may also be stored.

Those skilled in the art will appreciate that the foregoing steps (19)-(33) and related description mean estimating for each candidate value for the reference transmit symbol a candidate transmit sequence of the remaining transmit symbols, wherein the estimated transmit symbols for the layers other than said reference layer are determined on a bit-by-bit basis as a function of the candidate value for the reference symbol and the estimated transmit symbols selected previously for the layers not being the reference layer.

Figure 9:
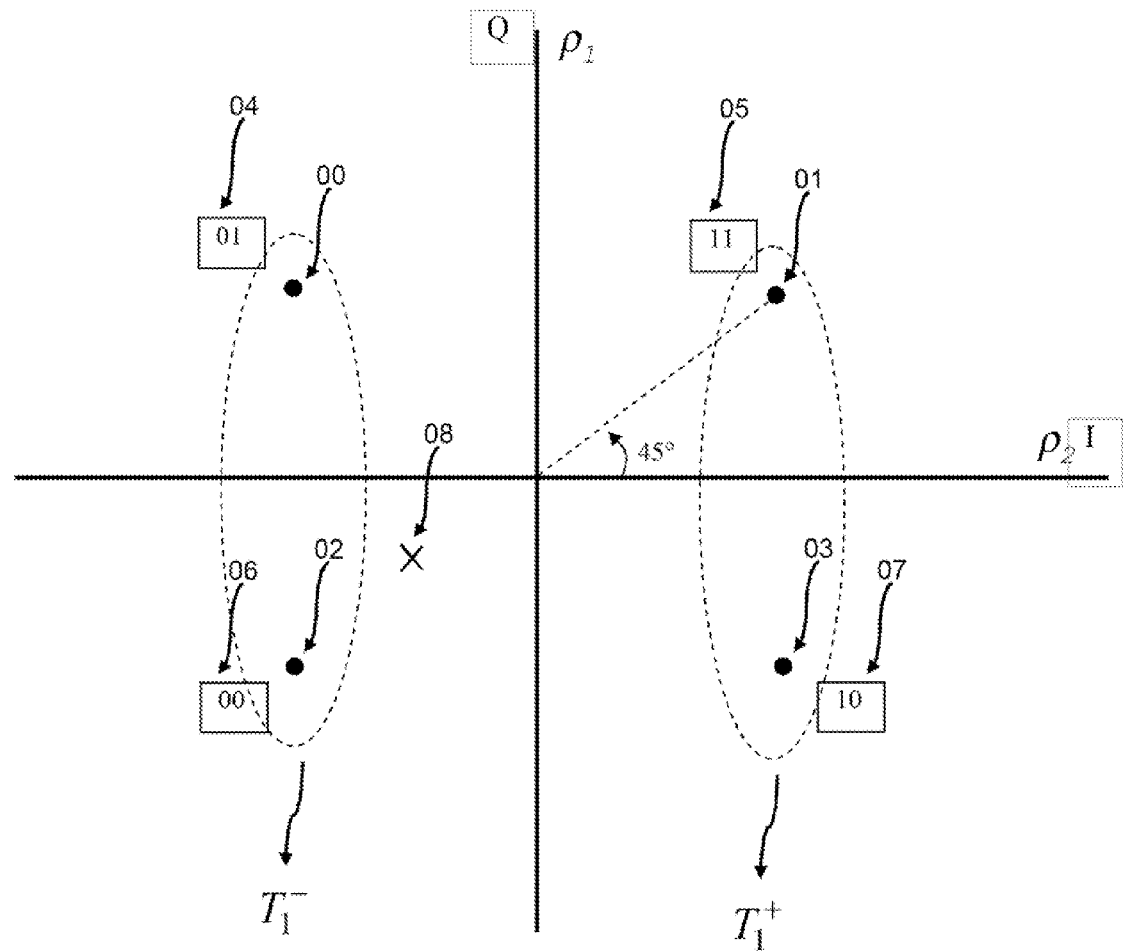
FIG. 9 illustrates an example of symmetric bit mapping onto transmitted complex symbols in accordance with this disclosure and related constellation partitioning performed during a demodulation process in accordance with this disclosure.

Even though any bit mapping rules may be used, in an embodiment, mapping rules are used, which result in geometric symmetry properties of the constellation symbols, such that $T_n^+$ and $T_n^-$ belong to two opposed semi-planes $\pi_n^+$ and $\pi_n^-$, respectively, having symmetry axis $\rho_n$, for every bit $b_n$, with $1 \leq n \leq M_c$. Among the eligible mapping rules satisfying the foregoing symmetry criterion, the achieved performance depends on the specific chosen mapping rule. As a purpose of illustration only, an example of QPSK constellation and mapping rule satisfying these properties is shown in FIG. 9.

In the absence of a-priori information, i.e., $L_{a,k} = 0$, this property would be equivalent to the following decision rule:

$$T_{n+1} \equiv \begin{cases} T_n^+ & \text{if } \dfrac{\hat{Y}_j^t}{r_{j,j}^t} \in \pi_n^+ \\ T_n^- & \text{if } \dfrac{\hat{Y}_j^t}{r_{j,j}^t} \in \pi_n^- \end{cases} \quad (34)$$

and as such it would yield the optimal choice for $\overline{X}_j^t$ once the mapped bits are selected.

Examples of bit mapping rules satisfying this criterion include, but are not limited to, the following:
2Mc-PAM with natural or Gray mapping;
2Mc-PSK with natural or Gray mapping;
2Mc-QAM with natural or Gray mapping, independent along the real and imaginary axes.

In the embodiment described in the foregoing, as a result of the bit-by-bit demodulation and re-mapping, only one mapped symbol is directly determined at every layer but the reference layer, for each candidate value considered for the reference layer. In comparison to equation (18), in this embodiment, the related number of searched candidate symbols is therefore only $$N = T^2 2^{M_c} \quad (35)$$

It should be noted that the associated number of searched sequences is instead T2Mc (each sequence being made of T symbols). It is noted that in both cases the linear dependence on T results from the fact that the process has to be repeated T times.

If all the possible partial Euclidean distance metrics would have to be explicitly calculated as shown in equation (27), a high complexity would be required, i.e., in the order of $O(T2^{2Mc}(T-1))$ as shown e.g., in equation (18), instead of the complexity shown in equation (35).

However, many pre-computed terms which depend only on the constellation symbols, may be reused in the calculation of the arithmetic means for the ED as shown in equation (19) or (27). In fact, in an embodiment of the description those terms are pre-computed and tabulated, e.g., stored in a memory. In order to better illustrate this issue, reference is made to equation (27) which may be expanded to:

$$\Delta\mu_{ED,n} = \mu_{ED,n}^+ - \mu_{ED,n}^- \quad (36)$$

$$= \frac{1}{2^{M_c-n}N_0}\left[-\sum_{X\in T_n^+}\left(|\hat{Y}_j^t|^2 - 2Re(\hat{Y}_j^t r_{j,j}^t X) + |r_{j,j}^t X|^2\right) + \sum_{X\in T_n^-}\left(|\hat{Y}_j^t|^2 - 2Re(\hat{Y}_j^{t*} r_{j,j}^t X) + |r_{j,j}^t X|^2\right)\right]$$

$$= \frac{1}{2^{M_c-n}N_0}\left\{2Re\left[\hat{Y}_j^{t*} r_{j,j}^t\left(\sum_{X\in T_n^+} X - \sum_{X\in T_n^-} X\right)\right] - |r_{j,j}^t|^2\left(\sum_{X\in T_n^+}|X|^2 - \sum_{X\in T_n^-}|X|^2\right)\right\}$$

Specifically, in an embodiment, the two differences between the summations as shown in equation (36) are pre-computed, and thus the computation of is straightforward. Their exact values depend on the bit mapping rules onto the constellation symbols.

Figure 10:
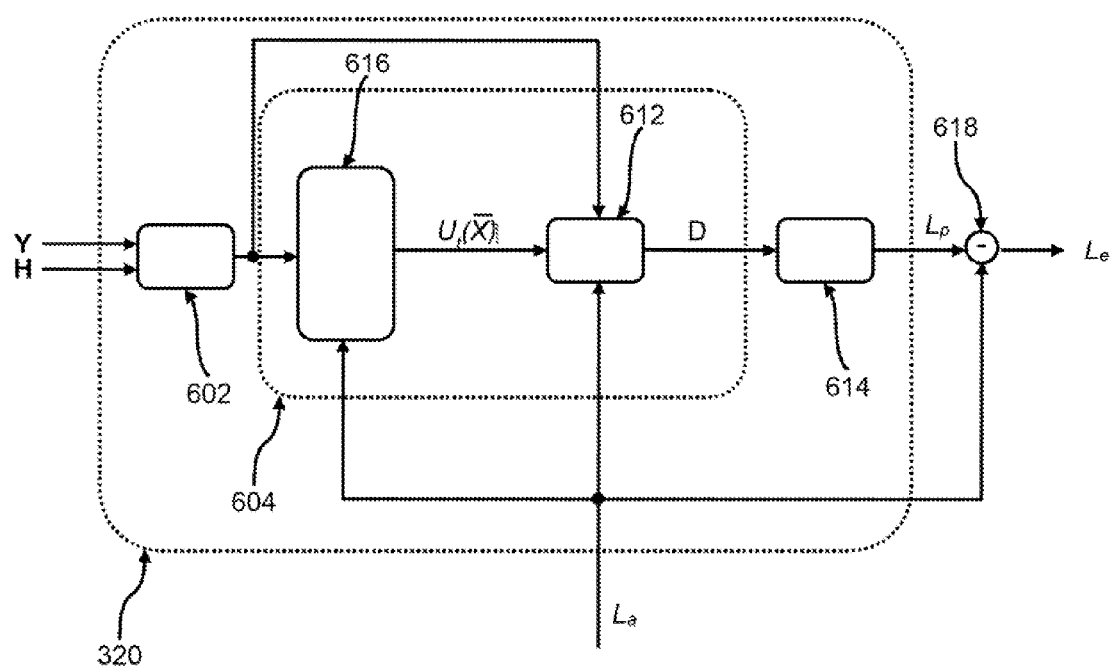
FIG. 10 illustrates an example method in accordance with this disclosure, suitable for iterative receiver schemes featuring a MIMO detector and an outer SISO decoder, wherein the detector outputs (extrinsic) bit soft information obtained from processing given input (a-priori) bit soft information output and fed back by the outer decoder.

FIG. 10 is a diagram illustrating an arrangement able to perform all the steps comprised in an embodiment of the present invention. Specifically, the flowchart refers to a single iteration or stage of MIMO IDD. Such arrangement may be used in multiple antenna communication receivers, which detect sequences of digitally modulated symbols transmitted from multiple antennas, wherein the MIMO detector generates extrinsic soft-output information by processing the a-priori soft information provided by a SISO ECC decoder.

As indicated in the foregoing, the detector approximates the computation of the maximum a-posteriori transmitted sequence by determining a set of candidates obtained by properly processing the received sequence Y, the channel state information matrix H and the a-priori bit soft information La.

Specifically, block 320 includes all the blocks that repeat their processing for a number of times equal to the number of transmit antennas, each time changing some parameter, or reading different memory stored values, related to the transmit antenna index.

Block 602 represents the means for or step of pre-processing the system equation (1) and particularly of the channel matrix H and the received vector Y, in order to factorize the channel matrix into a product of matrices of which one is a triangular matrix.

Block 604 includes, according to an embodiment, all the blocks that repeat their processing for a number of times equal to the number of elements included in the set C spanned by the reference symbols Xt, in each case assigning a different value to $X_r$.

Block 616 represents, according to an embodiment, the means for or step of determining the desired set of candidate transmit sequences $U_r(\bar{X})$ as a function of a candidate value(s) $\bar{x}$ for the reference layer(s).

Block 612 represents, according to an embodiment, the means for or step of computing and storing the APP metric D(X) as shown in equation (5) for $X\in U_r$.

Block 614 represents, according to an embodiment, the means for or step of computing the a-posteriori bit LLRs $L_p$ as shown in equation (12).

Once $L_p$ are available, a final subtraction of the input a-priori LLRs at block 618 is sufficient to generate the extrinsic $L_e$ as shown in equation (8).

As noted above, the channel state information H is assumed to be known at the receiver. Therefore, the receiver may include a set of rules having as input:
the (complex) received vector observations,
the (complex) channel path coefficients between the transmit and receive antennas, and
the properties of the desired QAM (or PSK) constellation to which the symbols belong.

Consequently, without prejudice to the underlying principles of the invention, the details and the embodiments may vary, even appreciably, with reference to what has been described by way of example only, without departing from the scope of the disclosure.

LIST OF REFERENCES

[1] IEEE P802.11n™/D2.0, "Draft Amendment to [ . . . ]—Part 11: Wireless LAN Medium Access Control (MAC) and Physical Layer (PHY) specifications: Enhancements for Higher Throughput", A. Stephens et al.
[2] Requirements and recommendations for WiMAX Forum™ Mobility Profiles, WiMAX, Service Providers Working Group, November 2005.
[3] Patent application "APPARATUS AND METHOD FOR DETECTING COMMUNICATIONS FROM MULTIPLE SOURCES", Publication number: WO2007012053, publ. date 25 Jan. 2007.
[4] Patent application "METHOD AND APPARATUS FOR MULTIPLE ANTENNA COMMUNICATIONS, AND RELATED SYSTEMS AND COMPUTER PROGRAM", Publication number: EP1971063, publ. date 17 Sep. 2008.
[5] M. Sellathurai and S. Haykin, "Turbo-BLAST for wireless communications: Theory and experiments", IEEE Trans. on Sign. Proc., vol. 50, pp. 2538-2546, Oct. 2002.
[6] M. Siti and M. P. Fitz, "A novel soft-output layered orthogonal lattice detector for multiple antenna communications.", Proc. IEEE Int. Conf. on Communications, June, 2006.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:
1. A method of detecting transmit sequences of digitally modulated transmit symbols, said transmit symbols being transmitted as digitally modulated symbols by multiple transmitting sources and received by multiple receiving elements, whereby said multiple transmitting sources and said multiple receiving elements jointly define a transmission channel modelled by a channel state information matrix and said received symbols are grouped as a received vector,
wherein the method includes:
a) selecting a transmitting source as a reference layer, wherein the associated transmit symbol represents a reference transmit symbol, b) processing said channel state information matrix, in order to factorize said channel state information matrix into a product of matrices of which at least one is a triangular matrix,
c) identifying a set of candidate values for said reference transmit symbol out of all possible modulated symbols,
d) determining a respective candidate transmit sequence for each said candidate value,
e) calculating a respective metric for each said candidate transmit sequence, and wherein said determining for each candidate value a respective candidate transmit sequence includes:

f) estimating for each said candidate value a candidate transmit sequence through a spatial decision feedback equalization process, wherein the candidate transmit symbols for the layers other than said reference layer are determined on a bit-by-bit basis as a function of said candidate value for said reference transmit symbol and the estimated transmit symbols selected previously for the layers not being said reference layer.

2. The method of claim 1, including selecting as a hard-decision estimate of the transmit sequence the candidate transmit sequence which maximizes said metric.

3. The method of claim 1, including calculating a-posteriori bit information.

4. The method of claim 3, wherein a-priori bit information is available from an outer module and wherein the method includes the steps of calculating extrinsic information as a function of said a-posteriori bit information and said a-priori bit information.

5. The method of claim 4, wherein said a-priori information is updated from said extrinsic information at each processing instance.

6. The method of claim 5, wherein said extrinsic information is calculated in at least two processing instances by:
calculating in a first instance said extrinsic information without any a-priori information, and
calculating in a second instance the extrinsic information from said a-priori information fed back from said module, until a decision on the bit value is made after a given number of instances.

7. The method of claim 3, wherein said selecting a transmitting source as a reference layer includes disposing both the layers corresponding to the transmitted symbols and the columns of said channel state information matrix, and wherein said selecting a transmitting source as a reference layer, said processing said channel state information matrix, said identifying a set of candidate values, said determining respective candidate transmit sequences, and said calculating respective metrics are repeated for a number of times equal to the number of transmitting sources, each time selecting a different transmitting source as reference layer, and wherein said a-posteriori bit information is calculated as a function of said metrics for said candidate transmit sequences.

8. The method of claim 1, wherein determining a candidate transmit symbol for a layer other than said reference layer includes repeating the following steps for a number of times equal to the number of bits of said transmit symbol, each time selecting a different bit index:
selecting a first and a second sub-set of transmit symbols, wherein symbols in each of said first and said second sub-set have opposite bit values at said bit index,
calculating a bit metric as a function of said first and said second sub-set,
selecting the bit of said candidate transmit symbol at said bit index as a function of said bit metric.

9. The method of claim 8, wherein said calculating said bit metric as a function of said first and said second sub-set includes calculating said bit metric as the difference between two partial a-posteriori probability metric terms, averaged over said first sub-set and over said second sub-set, respectively.

10. The method of claim 9, wherein said calculating said bit metric as the difference between two partial a-posteriori probability metric terms, averaged over said first sub-set and over said second sub-set, respectively, includes the step of summing a partial Euclidean distance term to an a-priori probability term for said candidate transmit symbol to be determined.

11. The method of claim 10, wherein said partial Euclidean distance term for said candidate transmit symbol to be determined is calculated as the opposite of the square magnitude of the difference between a processed received vector scalar term and a summation of products, each product being between a coefficient of a triangularized channel state information matrix and a corresponding transmit symbol, said transmit symbols being one of the following:
said candidate value for said reference transmit symbol,
said candidate transmit symbols selected previously for the layers not being said reference layer, or
said candidate transmit symbol to be determined taken from said first or said second sub-set.

12. The method of claim 10, wherein bit a-priori information is available from an outer module, said bit a-priori information being used for said calculating an a-priori probability term for said candidate transmit symbol to be determined, which belongs to either said first sub-set or said second sub-set.

13. The method of claim 9, wherein the difference between the partial Euclidean distance term of any of two possible transmit symbols belonging to said first or said second sub-set, respectively, is stored in a memory for use in said calculating said bit metric.

14. A device for detecting transmit sequences of digitally modulated transmit symbols, said transmit symbols being transmitted as digitally modulated symbols by multiple transmitting sources and received by multiple receiving elements, said device being configured for performing the method of claim 1.

15. The device of claim 14, wherein said device has at least two processing elements for performing simultaneously:
said processing, selecting, identifying, determining, calculating and storing for at least two different transmitting source, and/or
said determining for each candidate value a respective candidate transmit sequence for at least two different candidate values.

16. The device of claim 14, wherein said device has at least one pipeline for performing said determining candidate transmit symbols for the layers other than said reference layer.

17. A receiver for receiving transmit sequences of digitally modulated transmit symbols, the receiver including the device of claim 14.

18. The receiver of claim 17, wherein said transmitting sources and said receiving elements are antennas.

19. A computer program product loadable into the memory of a computer and comprising software code portions adapted for performing the steps of claim 1 when the product is run on a computer.

* * * * *